TOSHIO ABE
YOSHIO NISHI
KENKNI GOTO
INVENTORS
BY Stephen H. Frishauf
Atty

United States Patent Office 3,501,637
Patented Mar. 17, 1970

3,501,637

METHOD OF MEASURING THE THICKNESS OF THE HIGH RESISTIVITY LAYER OF SEMICONDUCTOR WAFERS

Toshio Abe, Yokohama-shi, Yoshio Nishi, Kamakura-shi, and Kenichi Goto, Kawasaki-shi, Japan, assignors to Tokyo Shibaura Electric Co., Ltd., Kawasaki-shi, Japan, a corporation of Japan Filed Jan. 26, 1968, Ser. No. 700,760
Claims priority, application Japan, Jan. 31, 1967, 42/5,771
Int. Cl. G01t 1/16
U.S. Cl. 250—83 7 Claims

ABSTRACT OF THE DISCLOSURE

The thickness of the high resistivity layer of a semiconductor wafer consisting of a high resistivity layer and a low resistivity diffused layer contiguous thereto is measured by a method comprising the steps of measuring the thickness of the high resistivity layer by the infrared ray interference method to determine a measured value T*obs*, measuring the total thickness of the semiconductor wafer to obtain a measured value T, establishing an experimental formula $Th=f$ (Tobs, T) which represents the thickness T*h* of the high resistivity layer as a function of the measured values T*obs* and T, and determining the thickness T*h* of the high resistivity layer of the semiconductor wafer according to the experimental formula.

This invention relates to a method of measuring the thickness of the layer of high resistivity of a semiconductor wafer having a layer of high resistivity and a layer of low resistivity contiguous thereto, and more particularly to such a measuring method especially suitable for a semiconductor wafer wherein said two layers have the same conductivity type and wherein the layer of low resistivity is formed by diffusing impurities into the layer of high resistivity.

Generally, power transistors are formed as the mesa type or the planar type and their collector layers are ordinarily constructed as two layers of the same conductivity type, that is N on $N^+$ or P on $P^+$-type in order to decrease their series resistance. Such two layered semiconductor wafers are generally formed by the epitaxial vapour growth technique or diffusion method. According to the diffusion method, at first $N^+$ or $P^+$ layers are formed on both surfaces of a N or P-type semiconductor wafer by diffusing donor or acceptor impurities and then one of the $N^+$ or $P^+$ layers formed on the opposite surfaces of the wafer is removed by grinding and polishing to retain the other $N^+$ or $P^+$ layer whereby a semiconductor wafer having two layers of N on $N^+$ or P on $P^+$-type is obtained. For example, in a transistor, since the thickness of the high resistivity N (or P) type layer of these two layers plays an important role in the fabrication of the transistor and since the thickness has intimate relations with the series resistance of the collector layer and with the reverse breakdown voltage of the collector region, the measurement of the thickness of the layer of high resistivity is an extremely important factor to produce in mass production scale transistors with a definite tolerance. While there have been proposed a number of methods of measuring the thickness of the layer of high resistivity, the so-called angular polishing method is the most noticeable. As described in an article entitled "Junction Delineation in Silicon by Gold Chemiplating." by S. J. Silverman and D. R. Benn in J. Electrochem. Soc., vol. 105 (1958), pages 170 to 172, the angular polishing method is particularly effective for semiconductor wafers having two layers of, for instance, P on $N^+$-types formed by diffusing donor impurities in P-type high resistivity semiconductor wafers.

According to this method, a side edge of a semiconductor wafer is obliquely polished to expose the interface between P and $N^+$ layers, then the exposed surface is subjected to the well known selective plating or chemical colouring treatment to make clearly visible the interface, then the treated surface is inspected under a microscope to measure the $N^+$ diffusion depth $Xj$, thereafter the total thickness T of the semiconductor wafer is measured by means of a micrometer, for example, whereby to obtain the required thickness $Tr$ of the P-type high resistivity layer by subtracting $Xj$ from $T$.

In this manner, the angular polishing method is an effective method since it can clearly indicate the interface when the high resistivity layer and the low resistivity layer are of the opposite conductivity type, whereas where these two layers are of the same conductivity type, N on $N^+$-type for example, the interface between N and $N^+$ layers, which is made by deep $N^+$ diffusion, would not be made clearly visible by the selective plating or chemical colouring treatment subsequent to angular polishing thus rendering quite difficult precise measurement by a microscope.

Thus, where two layers of a diffused semiconductor wafer are of the same conductivity types it is impossible to directly measure the thickness of the high resistivity layer by the angular polishing method so that each time a predetermined number of N-type wafers are subjected to the $N^+$-type diffusion treatment it is required to combine a number of P-type spare wafers to each lot.

In view of the fact that the present mass production of semiconductor devices consists of a tremendous number of lots, a large waste of semiconductor material arises that can not be overlooked. Further, the angular polishing method can not be applied to all products since this method is a destructive measuring method. On the other hand, an infrared ray interference method has been used to measure the thickness of the N-type layers of N or $N^+$ wafers obtained by the epitaxial vapour growth technique. According to this method a semiconductor wafer is irradiated with infrared rays through its surface of high resistivity layer, and the interference fringes created by the interference between the infrared rays that are reflected from the surface of the high resistivity layer and the infrared rays reflected from the interface between the high resistive layer and the low resistive layer are observed to measure the thickness of the high resistivity layer. This infrared ray interference method is particularly useful to measure the thickness of the high resistivity layers formed by the epitaxial vapour growth method and assure relatively accurate measurements for two layered semiconductor wafers wherein the two layers have the same conductivity type. However, where the semiconductor wafer is formed by the diffusion method since the concentration gradient of the impurity diffused in the low resistivity layer is very small, substantially no infrared ray interference fringes appear with a wavelength of the infrared rays of the order of 10∼35 microns which is usually utilised for the measurement of epitaxially grown wafers. However, we have found that when far infrared rays in the long wavelength range of more than 50 microns are used interference fringes appear. However, it was confirmed by our experiments that, even with such infrared rays in the long wavelength range the reflection does not occur at the interface but occurs at positions in the low resistivity layer beyond the interface, so that accurate measurements of the thickness of the high resistivity layers could not be realised.

The object of this invention is to provide an improved method of measuring the thickness of the high resistivity layer of a semiconductor wafer consisting of a high resistivity layer and a low resistivity layer contiguous thereto and more particularly to an improved measuring method suitable for a semiconductor wafer wherein said two layers have the same conductivity type and the low resistivity layer is formed by diffusing impurities in the high resistivity layer, and said method utilising a simple calculating equation.

According to this invention there is provided a method of measuring the thickness of the high resistivity layer of a semiconductor wafer consisting of a high resistivity layers and a low resistivity diffused layer contiguous thereto, said method comprising the steps of measuring a value of $T_{obs}$ representing the thickness of said high resistivity layer by the infrared ray interference method, measuring a value T representing the total thickness of said semiconductor wafer, obtaining an experimental formula $Th=f(T_{obs}, T)$ representing the thickness of said high resistivity layer as a function of said measured values $T_{obs}$ and T, and determining the thickness $Th$ of the high resistivity layer of said semiconductor wafer according to said experimental formula.

The invention can be more fully understood from the following detailed description when taken into consideration the accompanying drawings, in which.

Figure 1:
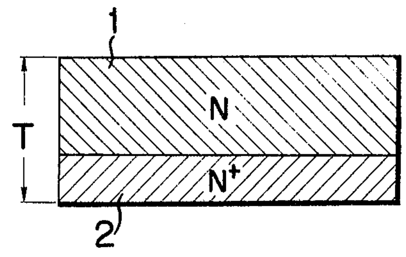
FIG. 1 shows a cross-sectional view of a typical semiconductor wafer having a high resistivity layer and a low resistivity layer.

As shown in FIG. 1, a semiconductor wafer to be measured by the method of this invention comprises a high resistivity layer 1 of the N conductivity type for example, and a $N^+$-type low resistivity layer 2 contiguous thereto. The low resistivity layer 2 is formed by diffusing impurities that impart $N^+$-type conductivity into the high resistivity layer 1 by a well known method. A typical method of diffusing impurities to prepare the semiconductor wafer used herein is as follows:

At first, a P-type silicon ingot and a N-type silicon ingot, respectively prepared by a conventional crystal pulling method, are sliced to a predetermined thickness in a direction perpendicular to their growth axes and both surfaces of each slice are then ground and polished to provide parallel surfaces by using a powder of aluminium of 1000 meshes (Tyler) thus producing P-type and N-type semiconductor wafers each having a thickness of about 500 microns. The resistivity of the N-type wafer is about 2 to 3 ohm-cm., while that of the P-type wafer is about 7 to 10 ohm-cm.

After cleaning the surfaces of the P-type and N-type semiconductor wafers with an aqueous solution of an organic solvent and a detergent the wafers are put into a furnace core tube (not shown) whose internal temperature is controlled within $1,200\pm1°$ C. Through the furnace core tube is passed a gaseous mixture consisting of nitrogen gas passed, at a rate of 18 liters/hr., over a liquid phosphoryl trichloride ($POCl_3$) in a vapouriser maintained at a temperature of $25\pm1°$ C. and communicated with the furnace core tube and oxygen gas supplied thereto at a rate of 30 liters/hr., through a branch tube communicated with the furnace core tube.

Thus, a gaseous mixture containing nitrogen gas, oxygen gas and phosphoryl trichloride ($POCl_3$) vapour is introduced into the furnace core tube to deposit on the opposite surfaces of said P-type and N-type semiconductor wafers glassy films containing phosphorous.

By this deposition for one hour, the phosphorous contained in the glassy films is diffused into the opposite surfaces of each semiconductor wafer.

The diffusion at this stage is hereinafter termed as the "primary diffusion." The sheet resistance of the diffused region at this stage is about 0.5 to 0.7 ohm per square. Then each of said semiconductor wafers is dipped in hydrofluoric acid to remove the glassy films deposited on both sides of each wafer. Then each wafer, from which the glassy films have been removed, is heated to a temperature of $1,285\pm1°$ C. in a furnace core tube passing a gaseous mixture of nitrogen gas at a rate of 100 liters/hr. and oxygen gas at a rate of 25 liters/hr. to cause the phosphorous which has been diffused in the primary diffusion to further diffuse into the body of wafer. This diffusion process is termed as the "secondary diffusion." The secondary diffusion is performed for respective wafers for different diffusion periods ranging from 55 to 162 hours.

Following the secondary diffusion process one P-type semiconductor wafer in the diffused lot is selected and the depth of the diffusion (designated by $X_j$) of the $N^+$ diffused layer obtained by diffusing the impurities (phosphorous) into the selected P-type semiconductor wafer is measured by the conventional method including angular polishing, selective plating and microscopic observation.

Figure 2:
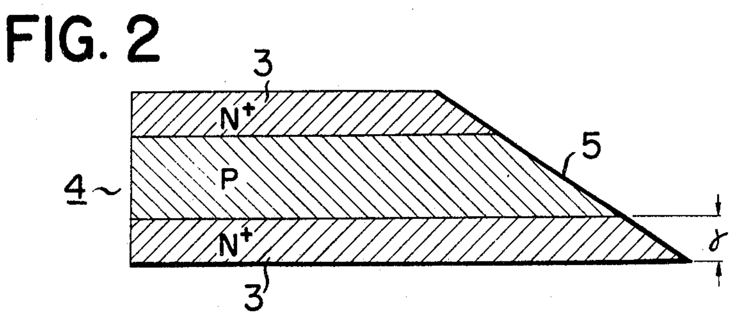
FIG. 2 is a schematic representation to illustrate the angular polishing method.

Referring now to FIG. 2 of the accompanying drawings, one side edge of said selected P-type semiconductor wafer 4 having $N^+$-type diffused layers 3 is obliquely ground to provide a polished surface 5.

By applying a selective plating or a selective colouring technique by a well known method to the polished surface 5 the $N^+$ diffused layers 3 formed in the body of the P-type semiconductor wafer 4 become clearly visible so that by inspecting the treated polished surface 5 with a microscope the depth of diffusion $X_j$ of the diffused layers 3 can be readily determined as above described.

On the other hand, only one surface of a N-type semiconductor wafer which has been formed with $N^+$-type diffused layers concurrently with said P-type semiconductor wafer is ground and polished away to provide a semiconductor wafer of the N on $N^+$-type as shown in FIG. 1.

The total thickness T of the wafer is then determined by means of an air micrometer, for example, and by subtracting the diffusion depth $X_j$ obtained from the abovementioned measuring process of the P-type semiconductor wafer from the total thickness T to obtain the thickness $T_r$ of the remaining high resistivity portion 1 of the N-type semiconductor wafer. Since substantially correct values of the diffusion depth $X_j$ and of the total thickness T can be obtained the thickness $T_r$ of the high resistivity layer 1 is also nearly correct. The method of determining $T_r$ from the diffusion depth $X_j$ and the total thickness T is herein defined as the "angular polishing method."

While in the above-mentioned measurement, the thickness $T_r$ of the N-type layer 1 of a semiconductor wafer of the N on $N^+$ construction is measured on the assumption that the thickness of its $N^+$ diffused layer 2 is equal to the diffusion depth $X_j$ of the $N^+$ diffused layer of a semiconductor wafer of the P on $N^+$ construction, the assumption that the diffusion depth of respective $N^+$ diffused layers are substantially equal is correct since $N^+$ diffused layers are formed concurrently on the P-type and N-type semiconductor wafers in the same diffusing furnace under the same condition, for example, with the same surface impurity concentration.

Then the thickness of the N-type high resistivity layer 1 of the semiconductor wafer shown in FIG. 1 is measured by the method utilising the interference fringes by infrared rays the measured thickness being represented by $T_{obs}$ in the following description.

Figure 3:
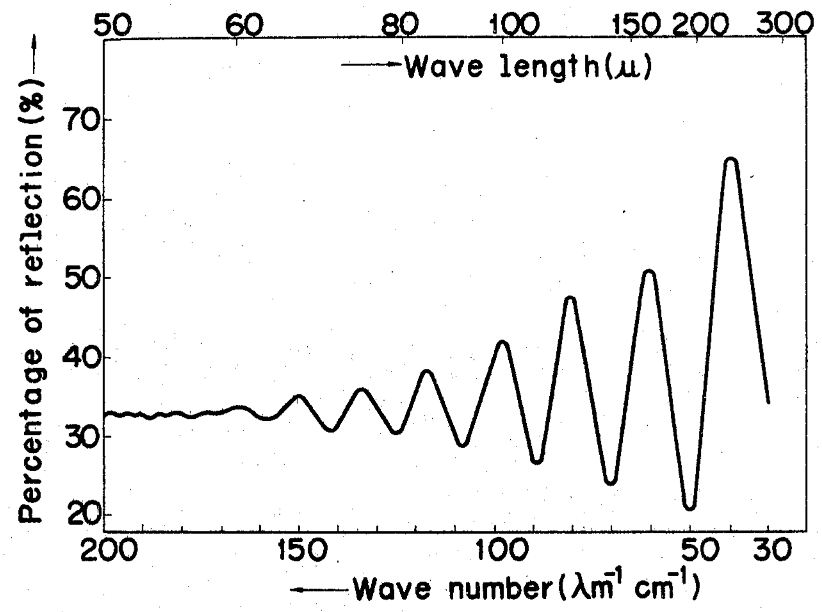
FIG. 3 is a plot to show the relationship between the infrared ray wavelength (or the wave number) and the percentage of reflection when the infrared rays are incident upon the N-type layer of the N or $N^+$-type semiconductor wafer having two layers shown in FIG. 1.
Figure 5:
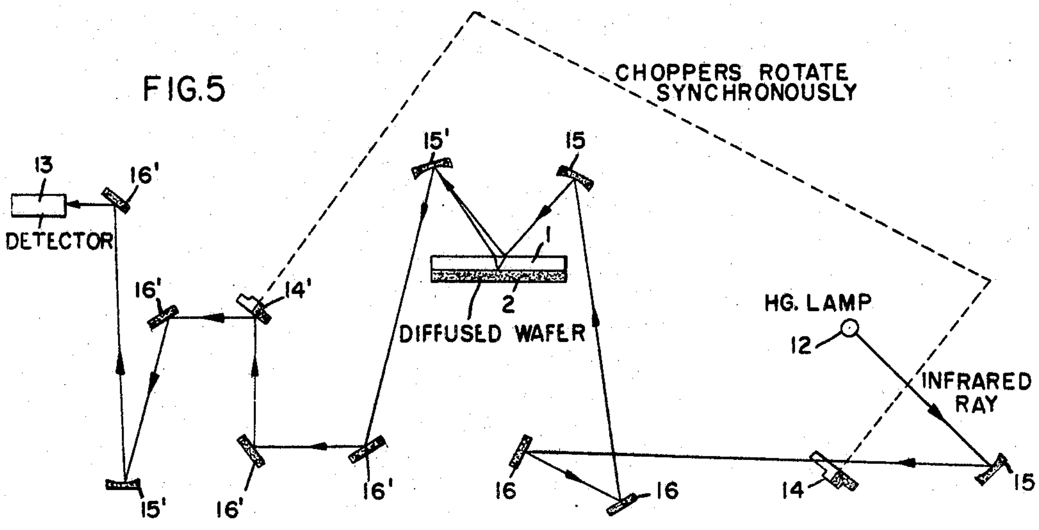
FIG. 5 shows a schematic structure for measuring the thickness of the high resistivity layer by the infrared ray interference method.

In the following the method of measuring the thickness of the high resistivity layer 1 from the interference fringes of infrared rays will be termed as the "infrared ray interference method." As shown in FIG. 5, infrared rays radiated from a hydrogen lamp 12 are irradiated through a first optical system comprising two concave mirrors 15, a rotatable chopping mirror 14 and two mirrors 16 into the high resistivity layer 1 from its surface to produce interference fringes caused by the interference between infrared rays respectively reflected from the surface of the layer 1 and from the interface between layers 1 and 2. The thickness T*obs* of the high resistivity layer 1 is determined by means of an infrared ray detector 13 from the interference fringes introduced therein through a second optical system consisting of a rotatable chopping mirror 14', two concave mirrors 15' and two mirrors 16'. Choppers 14 and 14' are arranged so as to be rotated synchronously with respect to each other. FIG. 3 shows a result of measurement representing the relationship between the wavelength of infrared rays irradiated to the surface of the high resistivity layer of a N on $N^+$-type semiconductor wafer and the percentage of their reflection. The curve shown in FIG. 3 is useful to determine the values of T*obs* which can be calculated according to a formula $$T_{obs}=\frac{l}{2\sqrt{n^2-\sin^2\theta}\,(\lambda_m^{-1}-\lambda_{m-l}^{-1})} \qquad (1)$$

This Formula 1 is based on the assumption that a pure semiconductor layer is adhering to a metal substrate and that the infrared rays incident to the pure semiconductor layer are perfectly reflected at the interface between the layer and the metal substrate.

This formula is used commonly and is described for example in an article of the title "Phase Shift Corrections for Infrared Interference Measurement of Epitaxial Layer Thickness," by P. A. Schumann, Jr., R. P. Phillips and P. J. Olschefski in J. Electrochem. Soc., vol. 113 (1966) pages 368 to 371.

In Formula 1, $\lambda m$ represents the wavelength of the incident infrared rays at an arbitrary selected point in FIG. 3 having the maximum or minimum percentage of reflection and $\lambda m-l$ represents the wavelength at a $l$th point of the maximum (or minimum) percentage of reflection ($l$ being an integer 1, 2, 3 . . .) on the longer wavelength side with respect to $\lambda m$ in FIG. 3. $n$ is the refraction coefficient of said pure semiconductor (in the case of silicon $n$ equals to 3.42) and $\theta$ the indicent angle of the infrared rays with respect to the surface of the semiconductor layer.

Figure 4:
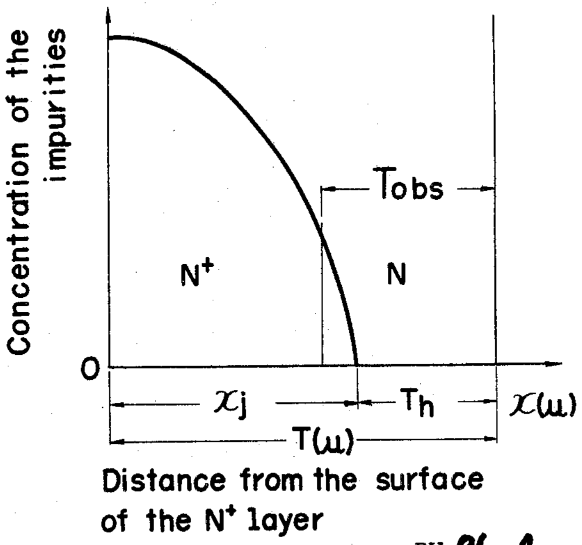
FIG. 4 is a plot to show the distribution of the concentration of the impurities diffused in the semiconductor wafer of the N on $N^+$ structure.

The concentration of the donor impurities in the semiconductor wafer shown in FIG. 1 has a considerably gentle slope as shown in FIG. 4 so that there is a substantial difference between the value of T*obs* as determined by the infrared ray interference method and the actual value T*r*. In FIG. 4 the abscissa $X(\mu)$ represents the distance forwards the N layer from the origin of the $N^+$ layer and the ordinate the concentration (logarithmic scale) of the donor impurities in the $N^+$ layer.

FIG. 3 shows a result of measurement made on a N on a $N^+$-type semiconductor wafer whose assumed diffusion depth $Xj$ is 100.5 microns and the thickness of the N layer is 49.3 microns. As can be clearly noted from this figure, distinct reflections or interference fringes appear in a range wherein the wavelength of infrared rays is longer than about 70 microns. By availing the result of measurement shown in FIG. 3 the wavelengths of the infrared rays at two points of the maximum percentage of reflection in a range of the wavelength of the infrared rays ranging between 100 to 300 microns were determined and the determined wavelengths were substituted in Formula 1 to obtain the value of T*obs* which was 76.0 microns.

From this result of calculation it can be seen that the value of T*obs* representing the thickness of the high resistivity layer as determined by Formula 1 by the infrared interference method is greatly different from the value of T*r* which is obtained by the angular polishing method and can be considered nearly correct.

By denoting by ΔT the difference between the thickness T*obs* of the high resistivity layer 1 as determined by the above described infrared interference method and the thickness T*r* of the high resistivity layer 1 as determined by the angular polishing method and can be considered nearly correct, ΔT can be expressed by the following equation $$Tobs-Tr=\Delta T \qquad (2)$$

Further ΔT is a function of the difference between the total thickness T of the semiconductor wafer and the measured values T*r* which can be regarded as a nearly correct value or of the diffusion depth X*j*.

Thus $$\Delta T=f(Xj) \qquad (3)$$

As will be described in more detail hereinafter, this Formula 3 is based on the experimental result that, in a semiconductor having high resistivity, when the surface concentration of the impurities that determines its conductivity type is nearly constant, and under a definite diffusion condition ΔT can be expressed as a function of X*j* alone irrespective of fluctuations in the diffusion process or the value of approximately true value T*r*.

Further from the above description $$Tr=T-Xj$$

So that the total thickness T of the semiconductor wafer can be shown by an equation $$T=Xj+Tr \qquad (4)$$

The method of measuring the thickness of the high resistivity layers according to this invention is characterised in that the measurement is performed accurately and simply by utilising said Equations 2 and 3. More particularly, by utilising Equations 2, 3 and 4, if any two variables among unknown variables T, T*r*, T*obs*, X*j* and ΔT were known the remaining three variables could be readily determined by calculations. Thus for example, when the value of T*obs* is determined by Formula 1 on the basis of the infrared interference method and the value of the total thickness T of the semiconductor wafer by means of a micrometer, the value of T*r* of the thickness of the high resistivity layer that can be regarded as the correct value could be simply and accurately determined.

Table I below shows values of the diffusion depth X*j*, total thickness T, thickness of T*r* of the N layer, T*obs* and ΔT of a N on $N^+$-type semiconductor wafer prepared in the above described manner, which are determined by the angular polishing method and the infrared interference method.

Nine samples used herein are of N on $N^+$-type but having different total thickness T.

TABLE I

| Sample No. | X*j* (μ) | T (μ) | T*r* (μ) | T*obs* (μ) | ΔT (μ) |
|---|---|---|---|---|---|
| 1–A | 102.5 | 183.3 | 80.8 | 108.2 | 27.4 |
| 1–B | 102.5 | 147.5 | 45.0 | 70.3 | 25.3 |
| 2–B | 121.8 | 147.7 | 25.9 | 59.4 | 33.5 |
| 2–C | 121.8 | 175.1 | 53.3 | 85.1 | 31.8 |
| 3–A | 135.1 | 184.6 | 49.5 | 85.1 | 35.6 |
| 3–B | 135.1 | 148.3 | 13.2 | 49.4 | 36.2 |
| 3–C | 135.1 | 175.3 | 40.2 | 78.7 | 38.5 |
| 4–A | 163.6 | 184.9 | 21.3 | 67.0 | 45.7 |
| 4–C | 163.6 | 175.2 | 11.6 | 57.6 | 46.0 |

As is obvious from Table I since ΔT is nearly dependent upon X*j* alone so that by plotting a regression line (not shown) by devoting values of ΔT and X*j* respectively by the ordinate and abscissa of a rectangular coordinate an experimental Formula 5 was obtained illustrating the relationship between ΔT and X*j*.

$$\Delta T \doteqdot -8.33+0.333Xj \qquad (5)$$

Then, from above described Equations 2, 4 and 5 the following Equation 6 is obtained, $$Th=12.5+1.5Tobs-0.5T \quad (6)$$

where $Th$ is the high resistivity layer's thickness, which is determined by the introduction of the experimental Formula 5 and is expected to be nearly equal to $Tr$.

Table II below represents the thickness $Th$ of N-type layers of respective samples obtained by substituting values of $Tobs$ and T shown in Table I in Equation 6 together with the values of $Tr$ in Table I for comparison.

TABLE II

| Sample No. | $Tr=T-Xj$ (μ) | $Th$ (μ) |
|---|---|---|
| 1–A | 80.8 | 83.0 |
| 1–B | 45.0 | 44.2 |
| 2–B | 25.9 | 27.7 |
| 2–C | 53.3 | 52.2 |
| 3–A | 49.5 | 48.0 |
| 3–B | 13.2 | 12.5 |
| 3–C | 40.2 | 42.9 |
| 4–A | 21.3 | 20.5 |
| 4–C | 11.6 | 11.3 |

As can be clearly noted from Table II, values of $Tr$ and $Th$ of each sample are very close. This shows that values of $Th$ representing the thickness of N layers as determined by Equation 6 are sufficiently reliable so that these values of $Th$ can be considered to represent the actual thickness of N layers. Further, although various samples having different values of $Xj$ were taken from lots wherein glassy films containing phosphorous were deposited on the surface of wafers in different manners, such difference in lots does not give any appreciable effect on $Th$, as is obvious from Tables I and II. Thus, the P-type spare wafers are used only during the procedure to derive Equation 6 so that the number of spare wafers used is very small. Once Equation 6 has been obtained it is no more necessary to use spare wafers.

Equation 6 can be represented by the following general equation:

$$Th=a+b \cdot Tobs-cT \quad (7)$$

where *a*, *b* and *c* represent constants and $Tobs$ the measured value of the thickness of the high resistivity layer of the wafer to be measured as determined by the infrared ray interference method. The constants *a*, *b* and *c* depend upon the type of substrate material, diffusion impurities and the like, and the values thereof vary in different cases.

In the mass production process of the N on $N^+$-type semiconductor wafers with their one surface polished, the value of $Tobs$ is measured by the infrared ray interference method in order to determine the thickness of the N layer. By substituting the values of $Tobs$ and T in Equation 7 it is able to determine non-destructively the thickness $Th$ of the layer N in an extremely simple and accurate manner.

Further, the method is very advantageous in that there is no waste of the semiconductor material and that the method can be performed without any high skill. Thus, the method is quite suitable for the mass production of semiconductor elements.

While in the above embodiment the angular polishing method was used to determine the thickness $Tr$ of the high resistivity layer of the semiconductor wafer that can be considered to represent approximately the true value, such value $Tr$ can also be obtained by the following method.

Thus, in the above embodiment, at first a spare wafer of P on $N^+$-type structure shown in FIG. 2 was subjected to angular polishing, the polished surface 5 was applied with a selective plating or subjected to a chemical colouring treatment and the treated surface 5 was then inspected by a microscope. However, the polished surface 5 of the wafer produced by the angular polishing process may be scanned with a heated fine metal wire to measure the thermo-electromotive force between the semiconductor wafer and the heated metal wire thus finding out a point at which the polarity of the electromotive force reverses. Since the polarity of the electromotive force is related to the conductivity type of the semiconductor wafer said reversing point corresponds to the interface between P and $N^+$ layers. As a result, it is able to readily determine the value of $Tr$ by the observation through a microscope concurrently with the scanning by the heated metal wire. This method too cannot provide direct measurement of the value of $Tr$ of the semiconductor wafer of the N on $N^+$-type, for example.

However, the value of $Tr$ can be directly determined by the following method.

For example, a polished surface of a N on $N^+$-type wafer produced by the angular polishing method is scanned by a whisker while at the same time the breakdown voltage between the wafer and the whisker is measured to observe by a microscope the point at which the breakdown voltage changes rapidly thus determining the value of $Tr$.

As described herein above this invention provides a method especially suitable for measuring the thickness of the high resistivity layer of two layered semiconductor wafers of N on $N^+$-type or P on $P^+$-type, more simply and economically than prior methods.

However, the method can also be applied for N on $N^+$-type wafers which were prepared by coating one surface of silicon wafers with protective coatings and then diffusing impurities into other surface. Further the semiconductor is not limited to silicon alone but other semiconductors such as germanium, gallium, arsenide, etc. can also be used. P on $P^+$-type wafers, P on $N^+$-type wafers and other various types of wafers can also be measured.

Further, even when a layer or layers of impurities are formed on the wafer such layers do not cause any trouble in so far as they do not prevent transmission of infrared rays to any undesired extent.

While the invention has been described in connection with some preferred embodiments thereof, the invention is not limited thereto and includes any modifications and alternations which fall within the true spirit and scope of the invention as defined in the appended claims.

What we claim is:

1. A method of determining the thickness of the high resistivity layer of a semiconductor wafer consisting of a high resistivity layer and a low resistivity layer contiguous thereto, comprising the steps of:

by infrared ray interference, obtaining a first measured quantity representative of the thickness of said high resistivity layer;

obtaining a second measured quantity equal to the total thickness of the semiconductor wafer; and combining said first and second measured quantities in accordance with a predetermined relationship whereby the actual thickness of said high resistivity layer is obtained.

2. The method according to claim 1 wherein said high resistivity layer and said low resistivity layer are of the same conductivity type.

3. The method according to claim 1, wherein said predetermined relationship is determined by:

preparing first and second semiconductor wafers, the first wafer consisting of a high resistivity layer of a first conductivity type and a low resistivity diffusion layer of said first conductivity type, the second wafer consisting of a high resistivity layer of a second conductivity type and a low resistivity layer of said first conductivity type, the low resistivity layers of said first and second wafers having the same concentration of impurities and being diffused under the same conditions;

by infrared ray interference, obtaining a third measured quantity representative of the thickness of the high resistivity layer of said first wafer;

by the angular polishing method, obtaining a fourth measured quantity equal to the actual thickness of the high resistivity layer of the second wafer; and co-relating said second, third and fourth measured quantities to arrive at said predetermined relationship which expresses the actual thickness of said high resistivity layer which was measured by said infrared ray interference method as a function of said first and second measured quantities.

4. The method according to claim 1 wherein said predetermined relationship is expressed by $$Th=a+b\cdot Tobs-cT$$

where $a$, $b$ and $c$ are constants, T is the total thickness of the wafer, T*obs* is the first measured quantity and T*h* is the actual thickness of the high resistivity layer.

5. The method according to claim 3 wherein said predetermined relationship is expressed by $$Th=a+b\cdot Tobs-cT$$

where $a$, $b$ and $c$ are constants, T is the total thickness of the wafer, T*obs* is the first measured quantity and T*h* is the actual thickness of the high resistivity layer.

6. The method according to claim 1 wherein the wavelength of the infrared rays utilised in said infrared ray interference method is more than 50 microns.

7. The method according to claim 3 wherein the wavelength of the infrared rays utilized in said infrared ray ference method is more than 50 microns.

References Cited

UNITED STATES PATENTS 3,017,512 1/1962 Wolbert ------------ 250—83.3
3,109,932 11/1963 Spitzer ------------ 250—83.3
3,206,603 9/1965 Mauro ------------ 250—83.3

RALPH G. NILSON, Primary Examiner

DAVIS L. WILLIS, Assistant Examiner

U.S. Cl. X.R.

250—83.3